(12) United States Patent
Ganti et al.

(10) Patent No.: US 9,499,216 B2
(45) Date of Patent: Nov. 22, 2016

(54) FLOOR LOAD STRUCTURE FOR VEHICLE BODY TO FRAME MOUNT

(71) Applicant: FORD GLOBAL TECHNOLOGIES, LLC, Dearborn, MI (US)

(72) Inventors: Satish Ganti, Canton, MI (US); John Edward Huber, Novi, MI (US); Michael M. Azzouz, Livonia, MI (US); Srinath Vijayakumar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/753,565

(22) Filed: Jun. 29, 2015

(65) Prior Publication Data

US 2015/0375808 A1    Dec. 31, 2015

Related U.S. Application Data

(62) Division of application No. 14/319,168, filed on Jun. 30, 2014, now Pat. No. 9,139,237.

(51) Int. Cl.

| | |
|---|---|
| *B62D 33/077* | (2006.01) |
| *B62D 29/00* | (2006.01) |
| *B62D 21/09* | (2006.01) |
| *B62D 25/20* | (2006.01) |
| *B62D 33/027* | (2006.01) |
| *B62D 24/04* | (2006.01) |
| *B62D 24/02* | (2006.01) |
| *F16F 1/38* | (2006.01) |
| *F16B 37/04* | (2006.01) |

(52) U.S. Cl.
CPC ............. *B62D 33/077* (2013.01); *B62D 21/09* (2013.01); *B62D 25/20* (2013.01); *B62D 25/2054* (2013.01); *B62D 29/008* (2013.01); *B62D 33/0273* (2013.01); *B62D 24/02* (2013.01); *B62D 24/04* (2013.01); *F16B 37/044* (2013.01); *F16F 1/38* (2013.01)

(58) Field of Classification Search
CPC ...... B62D 21/09; B62D 21/11; B62D 24/02; B62D 24/04; B62D 25/20; B62D 27/02; B62D 27/04; B62D 27/06; B62D 27/065; B62D 29/008; B62D 33/077
USPC ............ 296/29, 35.1, 35.3, 193.07; 267/292, 267/293, 294
See application file for complete search history.

(56) References Cited

U.S. PATENT DOCUMENTS

| | | |
|---|---|---|
| 2,864,647 A | 12/1958 | Chesna et al. |
| 3,112,950 A | 12/1963 | Jaskowiak |
| 3,279,843 A | 10/1966 | Hafer et al. |
| 3,388,944 A | 6/1968 | Crehore |
| 3,866,381 A | 2/1975 | Eschbach et al. |
| 5,352,011 A | 10/1994 | Kihara et al. |
| 5,409,283 A | 4/1995 | Ban |

(Continued)

*Primary Examiner* — Jason S Daniels
(74) *Attorney, Agent, or Firm* — Brooks Kushman P.C.; Jason C. Rogers (57) ABSTRACT

A vehicle floor structure includes a cross member having a substantially constant cross section shape. A spacing member is disposed beneath the cross member for securing to a chassis frame. The spacing member is positioned relative to the cross member to define an enclosed cavity between the spacing member and the cross member. The floor structure also includes a first collar affixed within the enclosed cavity. A fastener extends through the spacing member and the cross member, and compresses the first collar when the floor structure is secured to the chassis frame.

17 Claims, 6 Drawing Sheets

(56) References Cited

U.S. PATENT DOCUMENTS

| | | |
|---|---|---|
| 5,575,525 A | 11/1996 | Walworth, Jr. et al. |
| 5,741,026 A | 4/1998 | Bonnville |
| 5,897,139 A | 4/1999 | Aloe et al. |
| 5,915,727 A | 6/1999 | Bonnville |
| 6,047,988 A | 4/2000 | Aloe et al. |
| 6,193,273 B1 | 2/2001 | Novak et al. |
| 6,231,995 B1 | 5/2001 | Yamashita et al. |
| 6,742,808 B1 | 6/2004 | Kosak |
| 6,843,519 B2 | 1/2005 | Ojanen |
| 7,389,977 B1 | 6/2008 | Fernandez et al. |
| 8,636,314 B2 | 1/2014 | Mildner et al. |
| 2001/0052713 A1 | 12/2001 | Kim |
| 2005/0134069 A1 | 6/2005 | Odulio et al. |
| 2007/0251751 A1 | 11/2007 | Ball et al. |
| 2008/0084093 A1* | 4/2008 | Kishima ............. B62D 27/04 296/203.03 |
| 2012/0313399 A1 | 12/2012 | Caliskan et al. |
| 2013/0168989 A1 | 7/2013 | Sasage et al. |

\* cited by examiner

FLOOR LOAD STRUCTURE FOR VEHICLE BODY TO FRAME MOUNT

CROSS-REFERENCE TO RELATED APPLICATIONS

This application is a division of U.S. application Ser. No. 14/319,168, filed Jun. 30, 2014, now pending, the disclosure of which is hereby incorporated in its entirety by reference herein.

TECHNICAL FIELD

The present disclosure relates to a vehicle body mounting to a sub-frame.

BACKGROUND

Pickup trucks are motor vehicles with a front passenger cabin, and an open top rear cargo area, often referred to as a box. The box usually has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Passenger cabins and boxes may be separate assemblies or part of a single body structure. Pickup trucks are popular largely because the box allows greater flexibility of use, including carrying a variety of types of cargo and towing various types of trailers.

Traditionally the majority of body structures on pickup trucks have been formed from steel alloys. Through years of experience, pickup truck designers have learned how to engineer steel truck body parts that withstand a variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Certain areas of the body require resilience to frequent high load conditions. For example, mounting locations of the body to a chassis frame receive significant road loads, as the mass of the body rests on these mounting locations. The requirements of the mounting locations increase further for larger vehicles having more mass. The frequency and magnitude of loads input through the mounting locations can reduce overall customer drive quality by adversely affecting noise, vibration, and harshness (NVH) performance.

SUMMARY

In one example, a vehicle floor structure includes a cross member having a substantially constant cross section shape. A spacing member is disposed beneath the cross member for securing to a chassis frame. The spacing member is positioned relative to the cross member to define an enclosed cavity between the spacing member and the cross member. The floor structure also includes a first collar affixed within the enclosed cavity. A fastener extends through the spacing member and the cross member, and compresses the first collar when the floor structure is secured to the chassis frame.

In another example, a vehicle floor structure includes a mounting member defining a first enclosed cavity extending along a length and affixed to a floor panel. A spacing member is disposed beneath the mounting member and defines a second enclosed cavity between the spacing member and the mounting member. A collar disposed within each of the first and the second enclosed cavities, where each collar is in alignment with a mounting hole. A fastener extends through each collar for securing the mounting member to a chassis frame.

In a further example, a vehicle includes a chassis frame, and a passenger cabin having a floor panel mounted to the chassis frame. The vehicle also includes a mounting member sub-assembly affixed beneath the floor panel to secure the passenger cabin to the chassis frame. The mounting member sub-assembly includes a base plate having a horizontal wall that defines a mounting hole in alignment with a receptacle on the chassis frame. The base plate also includes a forward flange and a rearward flange extending vertically the horizontal wall. At least one doubling plate is affixed to the base plate and disposed about the mounting hole. The mounting member sub-assembly also includes a collar attached to the at least one doubling plate, and a capping plate attached to the base plate at the forward and rearward flanges above the collar. The capping plate defines an enclosed cavity between the capping plate and the base plate. The vehicle also includes a fastener spaced beneath the floor panel and extending through the mounting member sub-assembly for securing the passenger cabin to the chassis frame.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
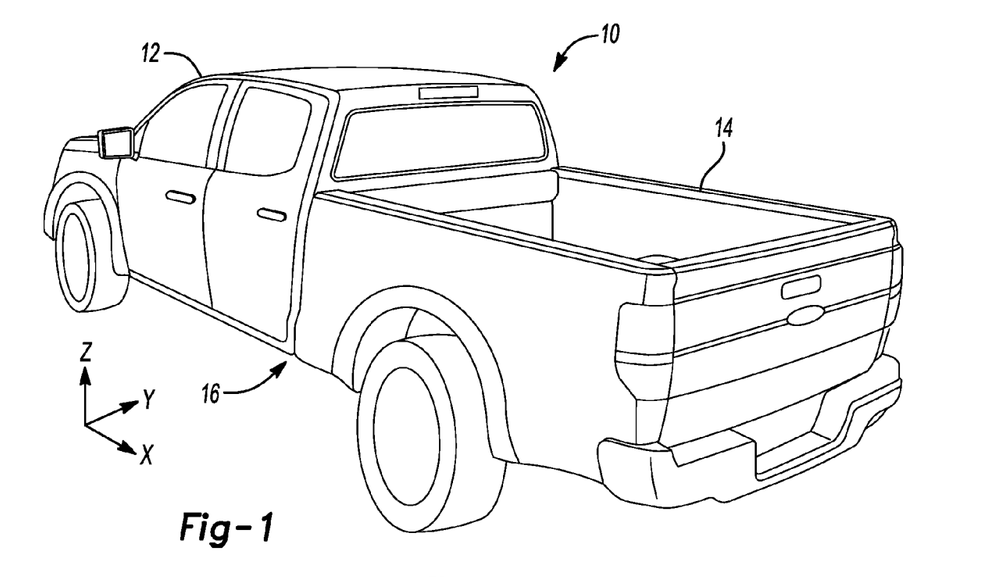
FIG. 1 is a rear elevation view of a vehicle.

FIG. 1 depicts an exterior elevation view of vehicle 10 that includes a passenger cabin 12 at a forward portion, and a cargo box 14 disposed rearward of the passenger cabin 12. Both of the passenger cabin 12 and the box 14 include an assembly of formed metal panels. In at least one embodiment, a substantial portion of the vehicle 10 is formed from a 6xxx series aluminum alloy. In other embodiments, a combination of different metals is employed in construction the vehicle 10. The vehicle 10 also includes a chassis frame 16 that provides mounting locations for several major vehicle components including the suspension and wheels, the engine, the drivetrain, the fuel tank, the passenger cabin 12, and the box 14.

Figure 2:
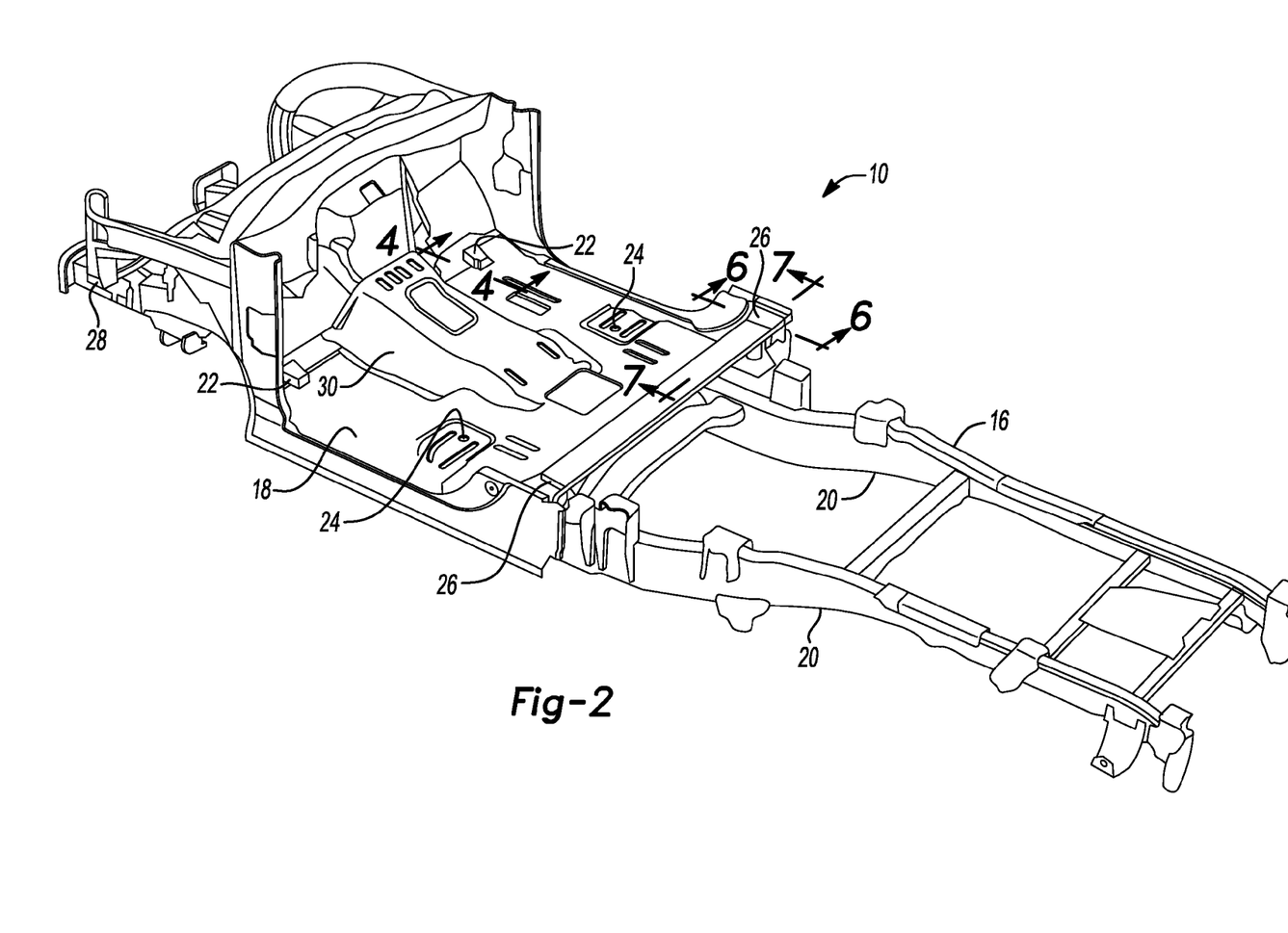
FIG. 2 is a rear elevation view of a cutaway portion of the vehicle of FIG. 1.

Referring to FIG. 2, several outer components of the vehicle 10 are removed to illustrate portions of the underlying structure. An upper portion of the passenger cabin 12, as well as the cargo box 14 is removed from view. The passenger cabin 12 includes a floor panel assembly 18 having several reinforcing parts. The floor panel assembly 18 provides mounting locations for many components of the vehicle such as interior seats, a console, and other trim parts.

The chassis frame 16 extends longitudinally beneath the floor panel assembly 18 and includes a pair of laterally spaced frame rails 20, each on opposing sides of the vehicle 10. The chassis 16 supports the floor panel 18 from beneath. The passenger cabin 12 may be affixed to the chassis frame 16 by fasteners, for example, such as bolts. The floor panel assembly 18 includes attachment features located at various positions for mounting the passenger cabin 12 to the vehicle chassis frame 16. For example, the floor panel assembly 18 includes a pair laterally spaced forward cabin body mounts 22. Similarly, the floor panel assembly 18 is secured to the chassis frame 16 at mid-cabin body mounts 24. Also, rearward cabin body mounts 26 secure the passenger cabin 12 to the chassis frame 16. The passenger cabin 12 may additionally be secured to the chassis frame 16 in the area of the engine compartment by engine bay body mounts 28. Road loads are transferred during driving from the vehicle wheels to the chassis frame 16. A strategy to manage the transfer of chassis loads into the structure of the passenger cabin 12 may limit noise, vibration, and harshness (NVH) during driving. Structural rigidity is increased at mounting locations of the passenger cabin 12 to distribute loads from the chassis frame 16 attachment points to larger areas of the floor panel 18.

A number of supporting reinforcements and cross members may be disposed beneath the floor panel assembly. At a forward portion of the floor panel assembly 18 there may be a formation, or front tunnel 30 to provide space for transmission components disposed beneath the passenger cabin 12. At the forward cabin body mounts 22, it may be conducive to provide separate reinforcements laterally spaced on either side of the vehicle. The transmission components may prevent a single floor supporting component from extending continuously laterally across the vehicle 10. At other locations elongate mounting members may be provided that span across a substantial portion of the lateral width of the passenger cabin 12. Each of mounting members increases local point stiffness at corresponding attachment locations, thereby efficiently distributing loads received at the passenger cabin from the chassis frame 16.

Figure 3:
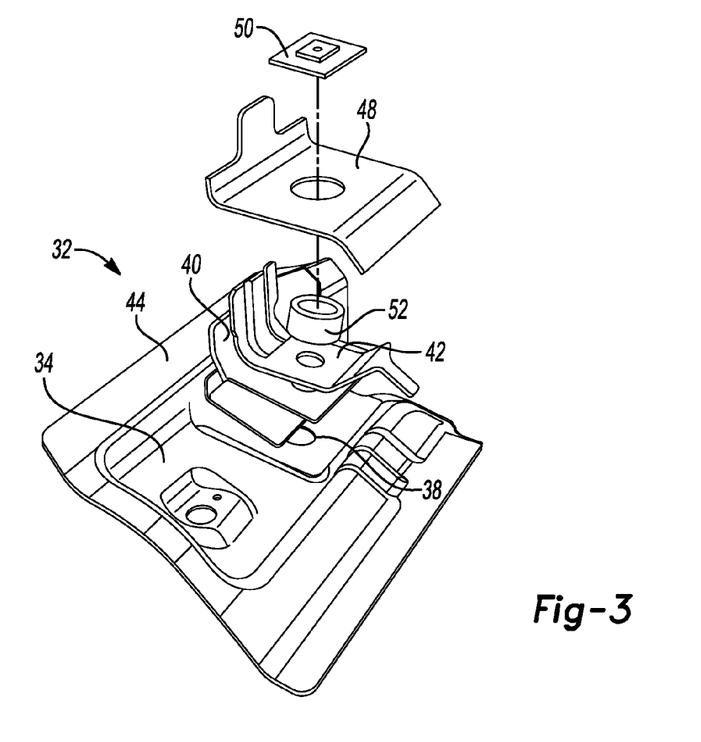
FIG. 3 is an exploded view of a front subfloor mounting member.
Figure 4:
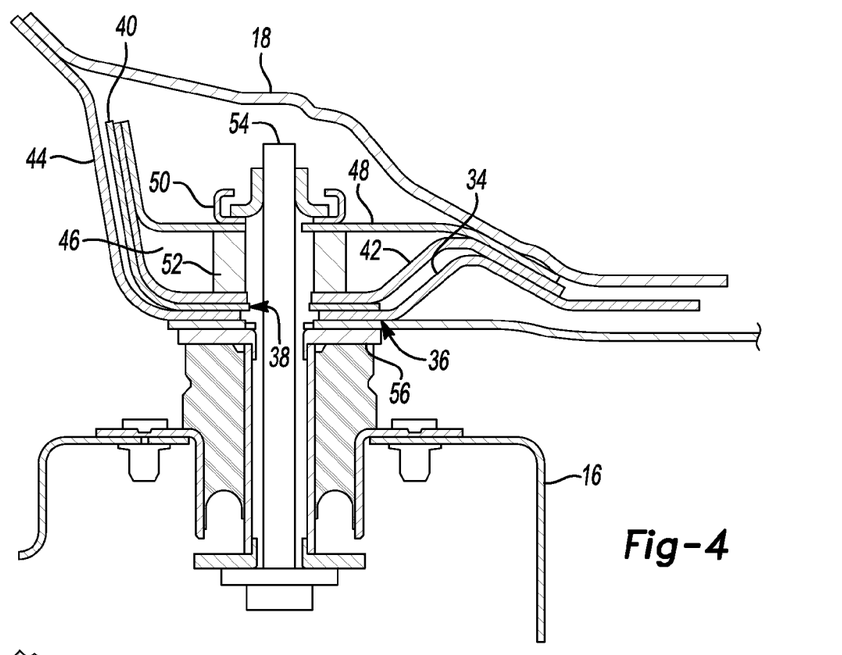
FIG. 4 is a side view cross section through the front subfloor mounting member taken along line 4-4 of FIG. 2.

Referring to FIGS. 3 and 4, an example of a mounting member is depicted. The example assembly may be representative of a forward mounting member 32 corresponding to the forward cabin body mounts 22. The forward mounting member 32 may be a sub-assembly having a plurality of reinforcements to provide adequate mounting stiffness. A base plate 34 has a generally horizontal wall 36 that defines a mounting hole 38 for receiving a fastener to secure the mounting member 32 to the chassis frame 16.

A plurality of steel doubling plates may be secured to the base plate 34 locally around the mounting hole 38. In the example of FIG. 3, a first doubling plate 40 and a second doubling plate 42 are affixed to the base plate 34. The first and second doubling plates 40, 42 may be arranged transversely with respect to each other to resist loads in a plurality of different directions. For example, the first doubling plate 40 may extend laterally to secure to the base plate 34 on either side of the mounting hole 38. The second doubling plate 42 may extend longitudinally to secure to the base plate 34 at opposing locations forward and rearward of the mounting hole 38. By joining each of the first and second doubling plates 40, 42 to the base plate 34 in opposing directions, excessive material stack-ups may be avoided. Each doubling plate may be sub-assembled with a two layer thickness joint.

The base plate 34 is provided with at least one generally upright wall 44 extending from the horizontal wall 36. The arrangement of the two walls defines a cavity 46. In the example of FIGS. 3 and 4, the base plate 34 includes two generally upright walls extending from the horizontal wall 36 such that the base plate 34 defines a U-shaped cross-section. The two upright walls are disposed on opposite sides of the mounting hole 38 so that the series of interconnected walls encompasses the mounting hole at a base portion of the U shape.

A capping plate 48 is affixed to the base plate 34 and encloses the cavity 46. An enclosed box section is formed by the assembly of the several components of the mounting member 32. The capping plate 48 includes a fixed threaded nut 50 for receiving a fastener that provides a clamp load through the joint. A collar 52 is affixed within the cavity 46 between the doubling plates and the capping plate 48. The formation of the enclosed box section increases the overall moment carrying capacity of the fastened joint.

The assembly of the mounting member 32 may include a combination of several components formed from dissimilar metals. For example, the base plate 34 and the floor panel assembly 18 may be formed from aluminum alloy sheet material. Each of the doubling plates 40, 42, the collar 52, and the capping plate 48 may be formed from a steel alloy. The steel components may include a resilient surface coating to reduce or eliminate galvanic corrosion effects that may otherwise occur related to a mixed material selection. The arrangement of the forward mounting member 32 is such that the base plate 34 is secured to the floor panel assembly 18. Notwithstanding the coatings, the steel components may be substantially isolated from the floor panel 18 that may be formed from aluminum sheet material.

A fastener 54 extends upwardly through a receiving member 56, or receptacle, of the chassis frame 16. The fastener 54 also extends through the mounting hole 38 of the base plate 34, and through a bore of the collar 52 to be received by the threaded nut 50. Clamp load is created along an axial direction of the fastener 54 and compresses the collar 52 within the fastened joint. The fastener 54 is arranged so that there is a gap between the tip of the fastener and an underside of the floor panel assembly 18 so the fastener 54 does not protrude into the passenger cabin.

The mounting member sub-assembly 32 may be constructed using a using a number of different suitable attachment methods including for example: self-piercing rivets, pop rivets, flow-drilling screws, Tox© clinch fastening, welding, adhesives, or a combination of multiple fastening types.

Figure 5:
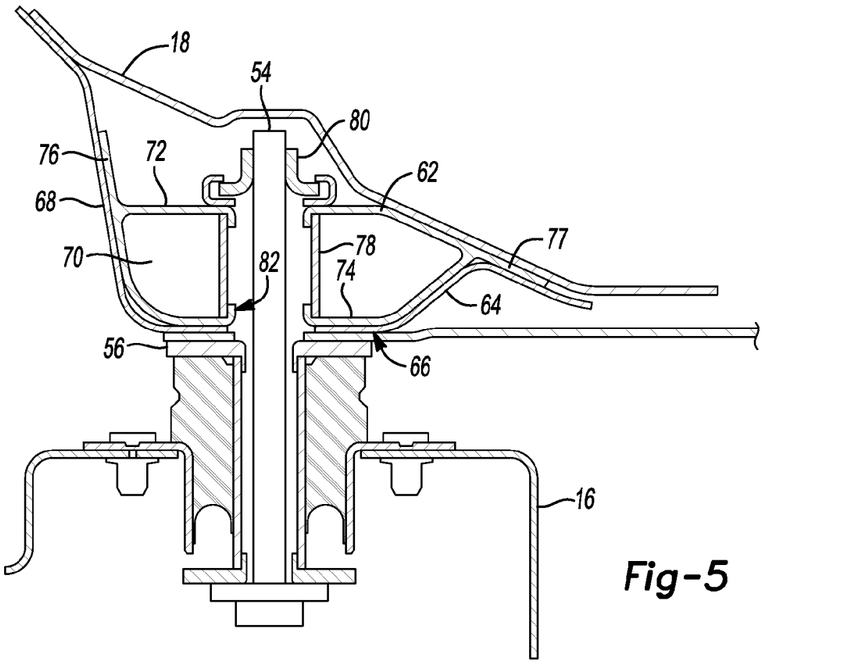
FIG. 5 is a side view cross section of an alternate embodiment front subfloor mounting member taken along line 4-4 of FIG. 2.

Referring to FIG. 5, an alternate embodiment forward mounting member is depicted. The mounting member may also be sub-assembled prior joining to the floor panel. However, an aluminum extruded reinforcement 62 integrates several parts into a single component. A base plate 64 defines a horizontal wall 66 that may abut the receiving member 56 of the chassis frame 16. The base plate 64 defines at least one upright wall 68 extending from the horizontal wall 66. Similar to previous embodiments, the two walls are oriented at differing angles to define an internal cavity 70. The extruded reinforcement 62 includes a constant cross section shape, and defines an enclosed center section. The extruded reinforcement 62 also includes an upper wall 72 and a lower wall 74 at a spaced distance relative to each other. The extruded reinforcement 62 is positioned in the internal cavity 70 and affixed to the base plate 64. In the example of FIG. 5, the extruded reinforcement 62 is joined to the base plate 64 at each of a forward flange 76 and a rearward flange 77. The extruded reinforcement 62 may also include a collar 78 that is compressed within the fastened joint. Similar to previous embodiments, the fastener 54 extends upwardly through a receiving member 56 of the chassis frame 16. The fastener 54 also extends through a mounting hole 82 of the base plate 64, and through a bore of the collar 78 to be received by a threaded nut 80. Securing the fastener 54 to the threaded nut 80 retains the mounting member to the chassis frame and compressively sandwiches the collar 78.

The extruded reinforcement 62 may achieve similar structural properties as a multi-piece assembly by having an increased wall thickness at higher stress locations. For example, the lower wall 74 may be provided with an increased thickness relative to the upper wall 72. The lower wall receives more direct loads from the chassis frame, so it may be advantageous to increase attachment point stiffness of the mounting member locally near the mounting hole 82.

At a rear portion of the passenger cabin 12 different challenges are presented as compared to the front. The vertical position of the chassis frame 16 beneath the box 14 is higher than the vertical position of the chassis frame 16 beneath the passenger cabin 12. A vertical transition between the relative heights may reduce package space at the rear of the floor panel assembly 18 to provide for the rearward cabin body mounts 26. To address this constraint, the floor panel assembly 18 includes an upward transition connected to a raised portion at the rear. Since the tunnel 30 formation does not extend to the rear of the floor panel 18, it may be desirable to provide a subfloor cross member that extends substantially across a lateral width of the vehicle. The increased component length allows for an elongate cross member to be secured to the chassis frame in at least two locations. A continuous part without formations or clearance notches will also have improved buckling capacity and body mount attachment stiffness.

Vehicle interior seats are secured to the floor panel 18 at various locations. Under certain operating conditions the seats impart loads upon the floor panel, for example from customer mass, vehicle dynamics, and/or crash events. For vehicle certification, loads as high as twenty times the weight of a seat assembly are applied to the seat in forward and rearward directions. Since the seat is mounted to the floor panel assembly, the applied loads are transferred to the floor structure. Also, seat belt anchor attachments are certified through the application of an oblique pull force applied at the attachment location of the seat belt to the floor assembly 18. The vehicle must provide sufficient stiffness to prevent excessive deformation in response to the loads. Also, the rearmost mounts of the rear seat tend to be located proximate to the rearward cabin body mount 26. Seat loads therefore are transferred to the structure of the floor cross member assembly.

Figure 6:
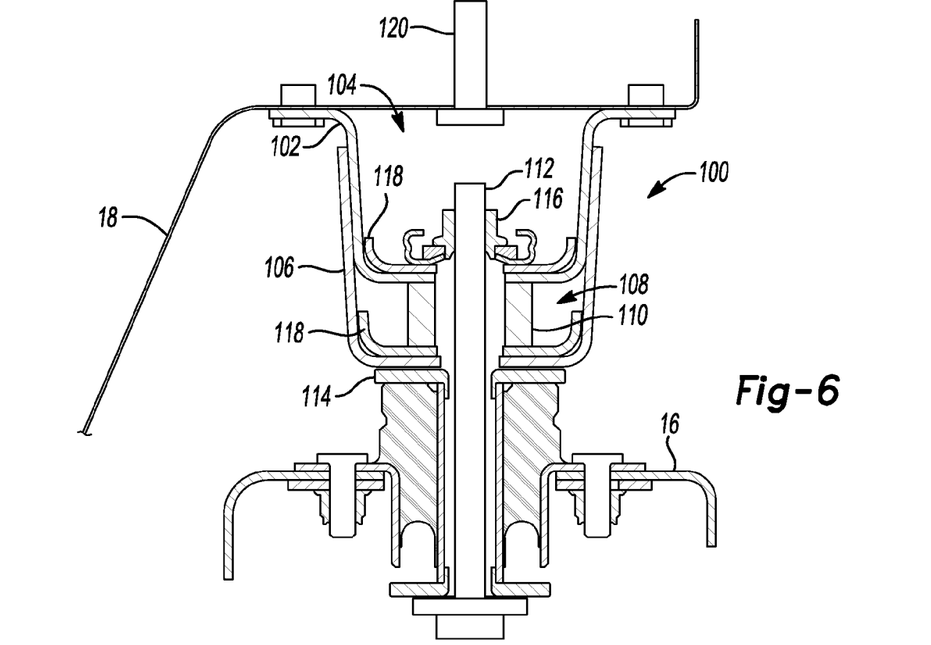
FIG. 6 is a side view cross section through a rear floor cross member assembly taken along line 6-6 of FIG. 2.
Figure 7:
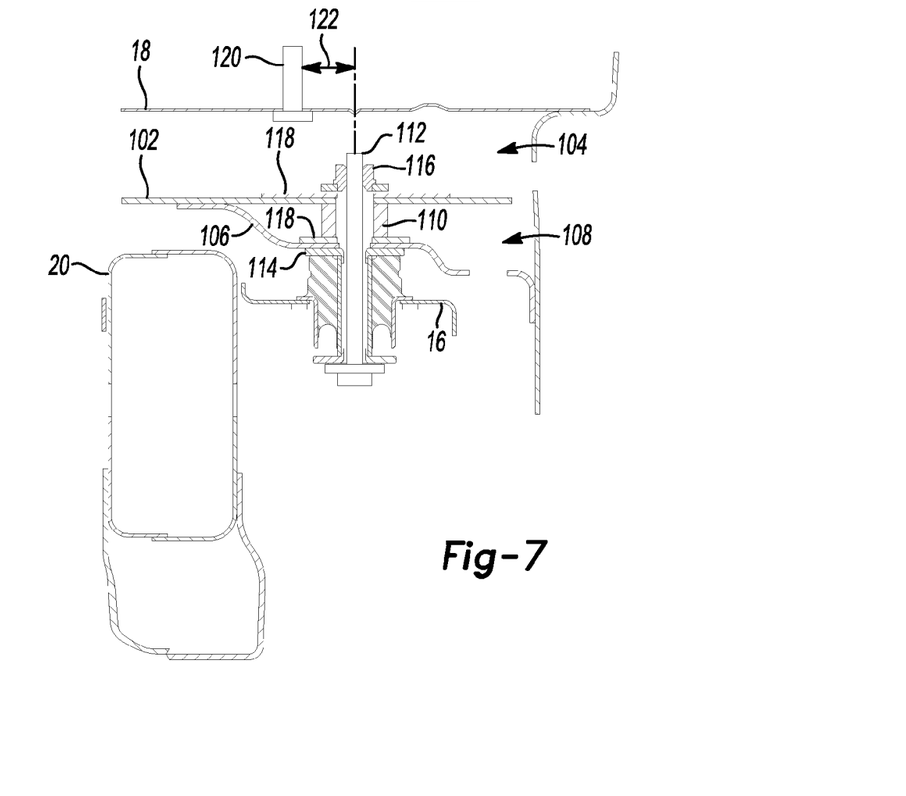
FIG. 7 is a rear view cross section through the rear floor cross member assembly taken along line 7-7 of FIG. 2.

Referring to FIGS. 6 and 7, a rear floor cross member assembly 100 may be provided to reinforce the floor of the passenger cabin 12 at the rearward cabin body mounts 26. A cross member 102 having a substantially constant cross section shape extends laterally across the cabin. For example, the cross member 102 may have a U-shaped cross section and be roll-formed from aluminum sheet material. The cross member 102 abuts the floor panel assembly from beneath to define an box section having a first enclosed cavity 104. The cross member assembly 100 also includes an spacing member 106 disposed beneath each opposing end of the cross member 102 to increase vertical clearance between the longitudinally extending frame rail 20 and the cross member 102.

The spacing member 106 may also have a U-shaped cross section that is coupled to the cross member 102 to define a second enclosed cavity 108. In at least one of the first or second enclosed cavities 104, 108 there is a collar 110 affixed within the fastened joint. The collar 110 operates to stabilize the lower second enclosed cavity and distribute loads input from the chassis frame 16. Although one collar is depicted in the example of FIGS. 6 and 7, an alternate embodiment may include two collars coupled in series, where a first collar is affixed within the first enclosed cavity, and a second collar is affixed within the second enclosed cavity.

A fastener 112 extends upwardly through a chassis frame receiving member 114 and through the collar 110 within the second enclosed cavity 108. A fixed nut 116 is disposed within the first enclosed cavity 104 to receive the fastener 112. The fastener 112 imparts a compressive load upon the collar 110 when secured to the fixed nut 116. At least one doubling plate 118 may also be disposed on each of the cross member 102 and the spacing member 106 to further distribute loads from the chassis frame 16.

The fastener 112 is disposed beneath the floor panel assembly 18 to maintain a vertical gap thereto. A seat attachment 120 may be affixed directly to the floor panel 18 above the fastener 112. The gap between fastener 112 and the floor panel allows the seat attachment 120 to be decoupled from the body mount fastener 112. The decoupling of the attachments may provide increased flexibility regarding the location of the seat attachment 120. The seat attachment 120 may be located without regard to the location of the chassis frame receiving member 114. In the example of FIG. 7, the seat attachment 120 is located to include a lateral offset 122 relative to the fastener 112.

Figure 8:
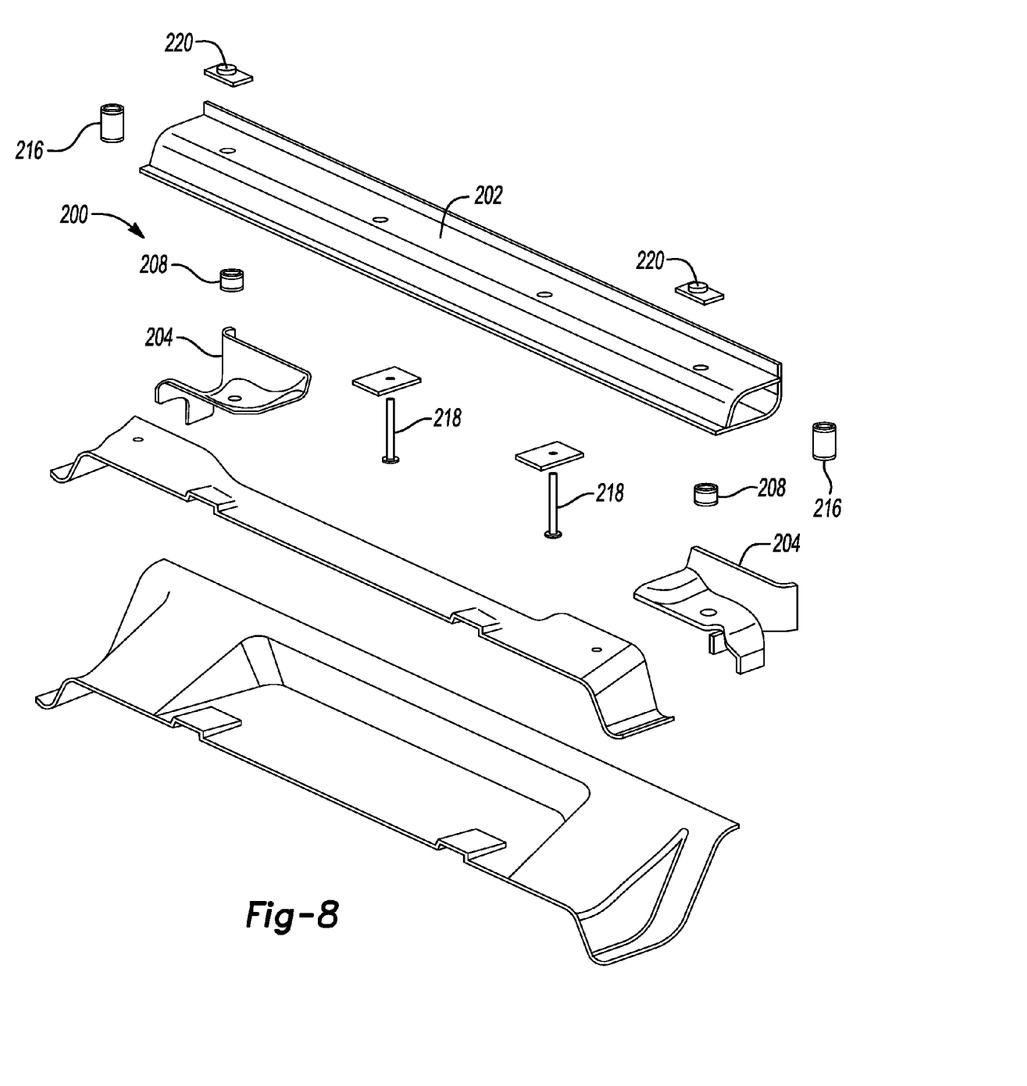
FIG. 8 is an exploded view of an alternate embodiment rear floor cross member assembly.
Figure 9:
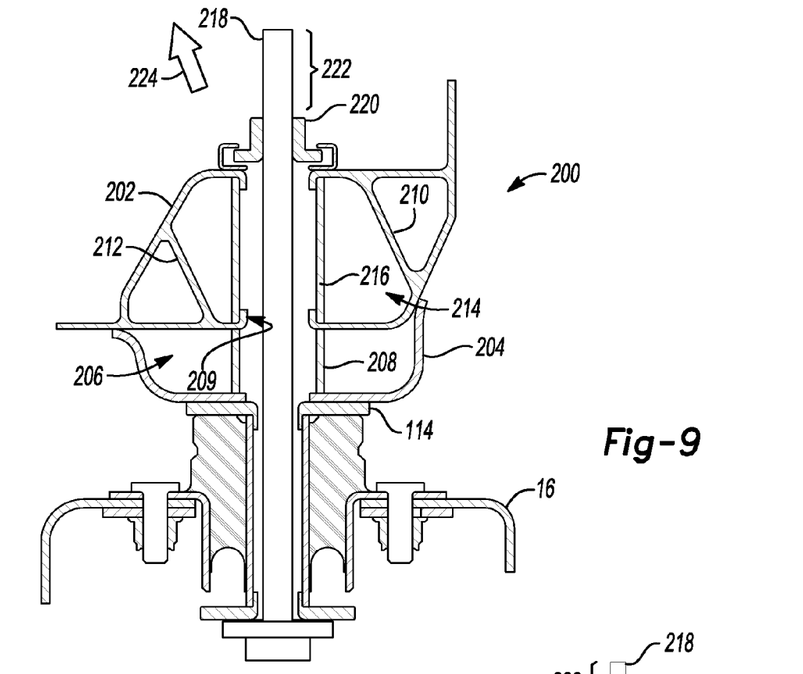
FIG. 9 is a side view cross section through the alternate embodiment rear floor cross member assembly taken along line 6-6 of FIG. 2.
Figure 10:
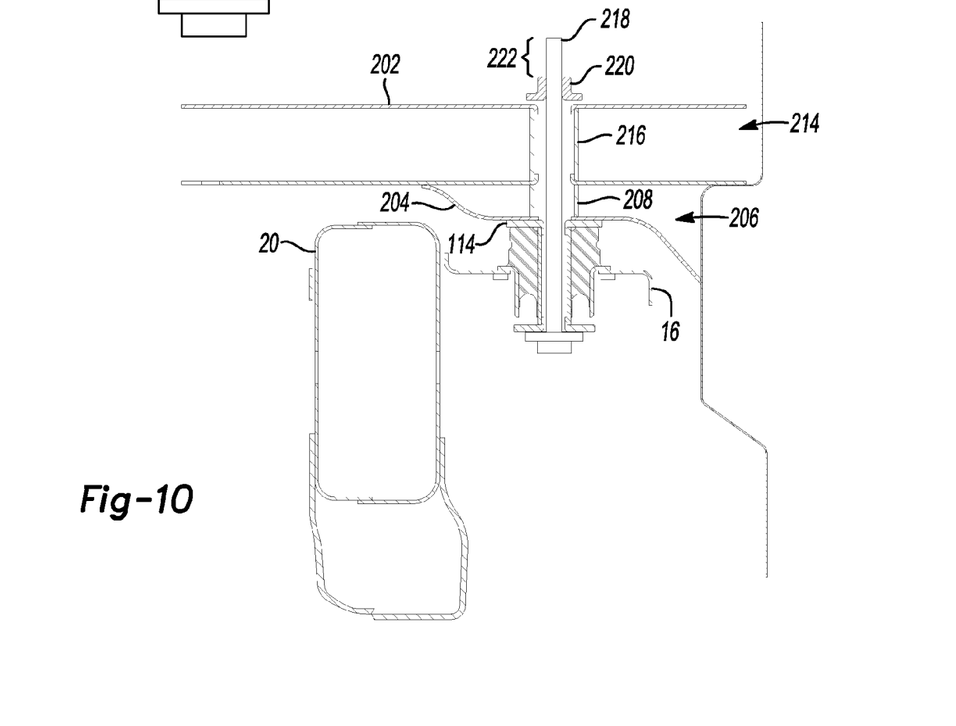
FIG. 10 is a rear view cross section through the alternate embodiment rear floor cross member assembly taken along line 7-7 of FIG. 2.

Referring to FIGS. 8, 9, and 10, an alternate embodiment rear floor cross member assembly 200 is depicted. An extruded cross member 202 includes a substantially constant cross section shape along its length. The cross member 202 is an elongate aluminum extrusion that extends substantially across the lateral width of the vehicle 10. The cross member assembly 200 also includes spacing members 204 disposed beneath opposing ends of the cross member 202 to increase vertical clearance between the extruded cross member 202 and the frame rails 20.

Similar to previous embodiments, the cross member assembly 200 includes a first enclosed cavity 206 defined by the spacing member 204. A first collar 208 is affixed within the first enclosed cavity 206 to increase the stiffness of the attachment at the spacing member 204. The first collar is in alignment with a mounting hole 209.

The extruded cross member 202 includes at least one internal wall to define a plurality of separate enclosed cavities within the extruded cross member 202. In the example of FIG. 9, the extruded cross member 202 includes a first internal wall 210 and a second internal wall 212 that separate the enclosed cavity of the extruded cross member 202 into three different sections. A central section 214 may accommodate a second collar 216 affixed about the attachment fastener 218. The second collar 216 is in axial alignment with the first collar 208 and the mounting hole 209. The fastener 218 extends upwardly from the receiving member 114 of the chassis frame 16 through both of the collars 208, 216 to be received by a threaded nut 220. The collars 208, 216 are stacked in series and operate as crush tubes to transfer loads from the chassis frame 16, through first enclosed cavity 206, to the central section 214 of the extruded cross member 202.

With reference to FIGS. 9 and 10, the fastener 218 is shown as a threaded bolt. The bolt is provided with sufficient length to extend through the cross member 202 with an extended portion 222 that protrudes beyond the threaded nut 220. The extended portion 222 includes enough thread engagement to allow an interior component to attach directly to the fastener 218. For example, either an interior seat or a seat belt anchor may be secure to the extended portion 222 of the fastener 218. Loads from the interior component may be transferred directly to the chassis frame 16 by way of the fastener 218. Although an elongated bolt is shown as an example, the fastener 218 may alternatively terminate within the enclosed section 214 similar to previous embodiments, and a separate seat attachment may be provided that is decoupled from fastener 218.

Referring specifically to FIG. 9, the first and second internal walls 210, 212 of the extruded cross member 202 are oriented at an oblique angle that corresponds to the direction of loading of the interior component. As discussed above, seat load certification requires forward and rearward horizontal forces to be applied to an interior seat assembly. Also, an oblique pull force may be applied at the location of the seat belt anchor attachment to the floor assembly 18. A force 224 is depicted to represent the direction of a reaction load of an interior component, such as a seat attachment or a seat belt anchor for example. The orientation of the internal walls 210, 212 is in alignment with the interior component loading direction. The orientation helps to directly counteract the force 224 and resist deformation of the cross member 202 caused by force 224. Although seat and seat belt attachments are described as an example, other interior components may benefit from an attachment that is coupled to a body mounting fastener.

Providing body to frame attachments with an enclosed cavity having a collar compressed within the cavity by a threaded fastener may provide improved load distribution. Clamping to a single panel layer is less resistant to local plate bending proximate to the fastener. Extension of the fastener to engage both of the upper and lower walls of the enclosed cavity significantly increases resistance to bending moments in a direction of shear loading of the vertical side walls. In other words, resistance to bending moments caused by horizontal loads (forward/rearward loads, cross-car loads) is improved according to the present disclosure. Additionally, the vertical height of the collar compressed between the upper and lower walls of the enclosed section may further influence the attachment point stiffness. The lateral stiffness increases as a function of the height of the collar used in the joint.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle floor structure comprising:
    a floor cross member defining a first cavity;
    a spacing member disposed beneath the cross member enclosing a second cavity;
    a first collar affixed within the first cavity aligned with a mounting hole;
    a second collar affixed within the second cavity aligned with the mounting hole; and
    a fastener extending through the first and second collars for securing the cross member to a chassis frame,
    wherein the cross member is an elongate aluminum extrusion that extends substantially across a lateral width of the vehicle and secures to the chassis frame at at least two locations.

2. The vehicle floor structure of claim 1 wherein the cross member includes internal walls within the first cavity that are oriented at an oblique angle aligned to counteract loads from an interior component attachment.

3. The vehicle floor structure of claim 1 wherein the fastener extends upwardly from the chassis frame through the cross member with an extended portion for attaching an interior seat.

4. The vehicle floor structure of claim 1 wherein each of the cross member and the spacing member is formed from an aluminum alloy sheet material.

5. The vehicle floor structure of claim 1 further comprising a seat attachment disposed above the cross member wherein the seat attachment is laterally offset from the fastener.

6. A vehicle floor structure comprising:
    a floor cross member defining a first cavity;
    a spacing member disposed beneath the cross member enclosing a second cavity;
    first and second collars aligned with a mounting hole and disposed in the first and second cavities, respectively; and
    a fastener extending upwardly from a chassis frame through the cross member and the first and second collars with an extended portion for attaching an interior seat to the cross member.

7. The vehicle floor structure of claim 6 wherein the cross member is an elongate aluminum extrusion that extends substantially across a lateral width of the vehicle and secures to the chassis frame at at least two locations.

8. The vehicle floor structure of claim 6 wherein the cross member is secured to the chassis frame at a single location.

9. The vehicle floor structure of claim 6 wherein the cross member includes internal walls within the first cavity that are oriented at an oblique angle aligned to counteract loads from an interior component attachment.

10. The vehicle floor structure of claim 6 further comprising a seat attachment disposed above the cross member wherein the seat attachment is laterally offset from the fastener.

11. A vehicle floor structure comprising:
    a mounting member affixed to a floor panel and having internal walls oriented at an oblique angle enclosing a first cavity;
    a spacing member disposed beneath the mounting member enclosing a second cavity;
    a collar aligned with a mounting hole and disposed in one of the first and second cavities; and a fastener extending through the mounting hole in the collar for securing the mounting member to a chassis frame.

12. The vehicle floor structure of claim 11 wherein the mounting member is an elongate aluminum extrusion that extends substantially across a lateral width of the vehicle and secures to the chassis frame at at least two locations.

13. The vehicle floor structure of claim 11 wherein the fastener extends upwardly from the chassis frame through the mounting member with an extended portion for attaching an interior seat.

14. The vehicle floor structure of claim 13 further comprising a seat attachment disposed above the mounting member wherein the seat attachment is laterally offset from the fastener.

15. The vehicle floor structure of claim 11 wherein each of the mounting member and the spacing member is formed from an aluminum alloy sheet material.

16. The vehicle floor structure of claim 11 further comprising a second collar aligned with the mounting hole and disposed in the first cavity.

17. The vehicle floor structure of claim 11 wherein the spacing member is connected to the mounting member so that the second cavity is enclosed between the spacing member and the mounting member and the collar.

\* \* \* \* \*